United States Patent Office 3,830,836
Patented Aug. 20, 1974

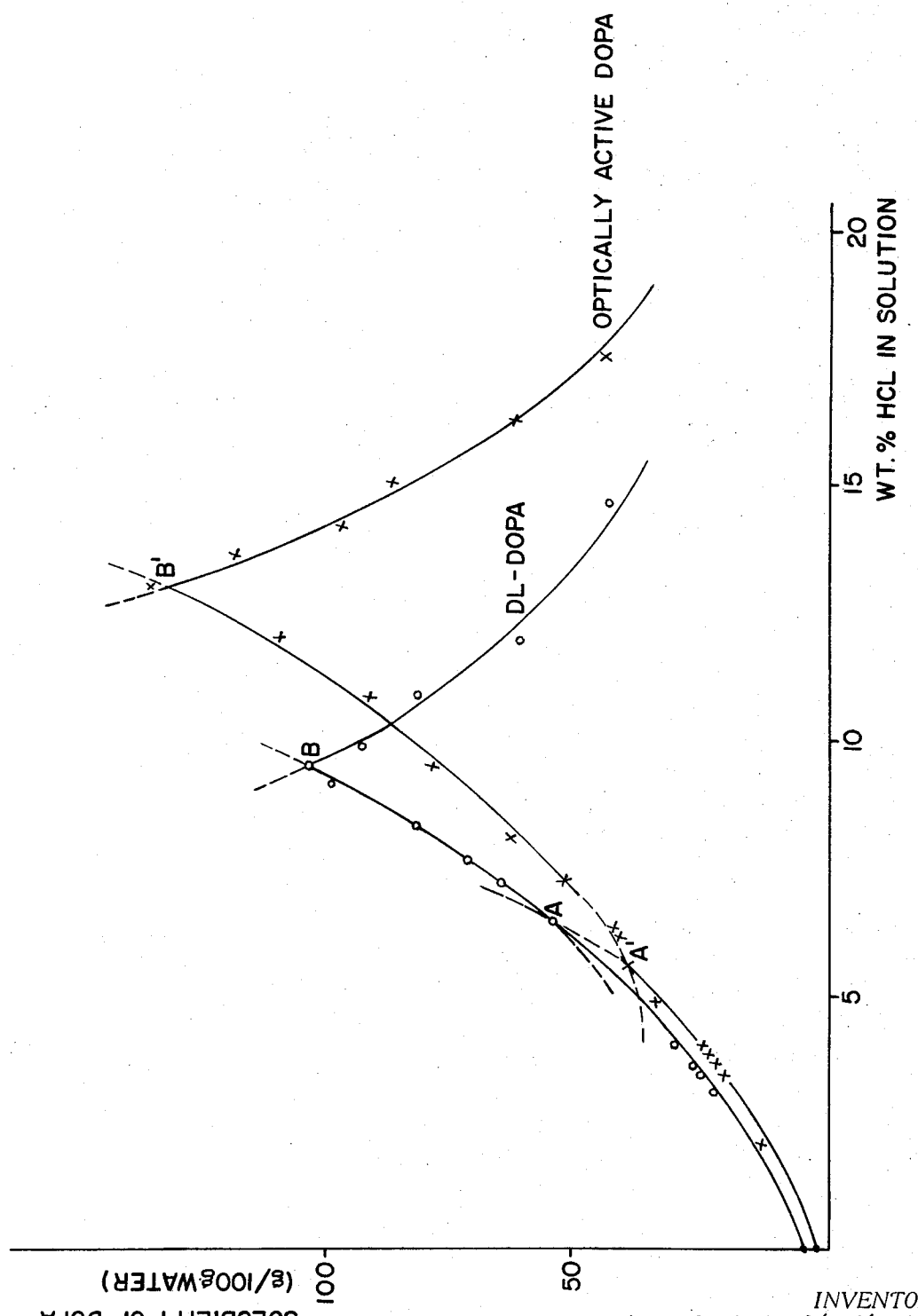

3,830,836
3,4-DIHYDROXYPHENYLALANINE
HEMIHYDROCHLORIDE
Soichiro Asai, Kenichi Yarita, Teruo Uzuki, Kouhei Kimura, and Hiroo Kageyama, Kanagawa, Japan, assignors to Ajinomoto Co., Inc., Tokyo, Japan
Filed Oct. 6, 1971, Ser. No. 186,983
Claims priority, application Japan, Oct. 15, 1970, 45/90,738; Oct. 31, 1970, 45/96,193; Dec. 28, 1970, 46/128,861; Dec. 30, 1970, 46/128,715
Int. Cl. C07c 101/72
U.S. Cl. 260—519    1 Claim

ABSTRACT OF THE DISCLOSURE

DOPA [$\beta$-(dihydroxyphenyl)-alanine] forms a hemihydrochloride which crystallizes in coarse prisms having a more favorable weight-to-surface ratio and capable of more convenient optical resolution by seeding of its supersaturated solutions than DOPA itself so that very pure L-DOPA can be obtained from crude DL-DOPA by conversion of the crude racemate to the hemichloride, resolution of the latter, and conversion of the L-DOPA hemichloride to L-DOPA.

BACKGROUND OF THE INVENTION

This invention relates to the optical resolution and purification of DOPA [$\beta$ - (dihydroxyphenyl)-alanine], and particularly to a novel derivative of DOPA and to a method in which DL-DOPA is converted to the derivative, the latter is optically resolved, and an optically active enantiomorph of the derivative is converted to optically active DOPA.

L-DOPA is a known therapeutic agent for the treatment of Parkinsons's disease. Depending on the temperature at which it is crystallized and on the solvent employed, it forms small platelets or fine needles which, because of their high surface-to-weight ratio, tend to absorb impurities from the mother liquor and to oxidize in the atmosphere in the presence of moisture. For the same reasons, it is relatively difficult to obtain optically pure L-DOPA by seeding of supersaturated solutions of synthetic DL-DOPA with crystals of the L-isomorph. Yet, the D-isomorph is toxic enough to require removal from L-DOPA which is administered in large doses.

SUMMARY OF THE INVENTION

It has now been mound that DOPA forms a hemihydrochloride which crystallizes in coarse prisms having a much more favorable surface-to-weight ratio than the crystals of DOPA, and which is so readily decomposed to DOPA that much purer L-DOPA can be produced by way of the hemihydrochloride than by direct resolution of DL-DOPA. The D-isomer of the hemihydrocloride, hereinafter referred to as DOPA.½HCl, does not tend to crystallize spontaneously from its supersaturated solutions without seeding at a rate comparable to the spontaneous crystallization rate of D-DOPA, and this greatly facilitates the optical resolution of DL-DOPA.½HCl. D-DOPA.½HCl does not racemize as readily as D-DOPA, but this fact does not significantly affect the practical value of the method of the invention.

The invention is based on the finding that the solubility curve of DL-DOPA and L-DOPA or D-DOPA in aqueous hydrochloric acid each have two points of discontinuity.

BRIEF DESCRIPTION OF THE DRAWING

The sole figure of the attached drawing is a graph of the solubilities of racemic and optically active DOPA in grams per 100 ml. water at 50° C. as a function of the concentration of hydrogen chloride in the solution in percent by weight.

GENERAL DISCUSSION OF THE INVENTION

As is evident from the drawing, the solubility of DL-DOPA in aqueous hydrochloric acid rises at 50° C. in a smooth curve to approximately 6.5% HCl at point A. At that concentration, the slope of the curve decreases suddenly, and solubility thereafter increases in a smooth curve to a maximum B at about 9.5% HCl, and sharply drops as the HCl concentration increase further.

The common solubility curve of L-DOPA and D-DOPA has the same general characteristics with a point A' of discontinuity at about 5.5% HCl and a maximum B' at about 13% HCl. At HCl concentrations below about 10.5%, the DL-form is more soluble than the optically active forms, and the latter are more soluble at higher concentrations within the range illustrated.

The location of the points of discontinuity A, A' and of the maxima B, B' is somewhat affected by the temperature of the solution, but the general characteristics of the solubility curves are independent of the temperature of the liquid. Over the range from 10° to 80° C., which is most important from a practical point of view, A is at 5.5–7.5%, B at 8.5–10.5%, A' at 4.5–6.5%, and B' at 12–15%.

It has been found that solutions of DL-DOPA in aqueous hydrochloric acid at concentrations between A and B, when permitted to crystallize, precipitate DL-DOPA.½HCl as the solid phase. and that optically active DOPA.½HCl is the crystalline material rsulting from crystallization of the optically active DOPA isomers under conditions represented by the portion of the corresponding curve between points A' and B'. At higher concentrations of HCl, the precipitates consist of the corresponding monochlorohydrates, and mixtures of the hemi- and monohydrochlorides were obtained at B, B'.

At the ternary point A a solution of DL-DOPA is thus comptible with DL-DOPA and its hemihydrochloride. At B, it is compatible with (that is, nonreactive toward) both the hemihydrochloride and the monohydrochloride, below A, it is compatible with DL-DOPA only, between A and B only with the hemihydrochloride, and above B only with the monohydrochloride. Analogous compatibilities hold for optically active DOPA.

Crystallization from supersaturated solutions compatible with DOPA.½HCl is hastened by seeding in the usual manner, but the crystallization rate of the hemihydrochlorides from their seeded, supersaturated solutions is much higher than that of DOPA under otherwise comparable conditions so that fewer and coarser crystals are formed which, because of this fact, tend to absorb or adsorb less of the mother liquor and of impurities contained therein.

It has been found that the X-ray diffraction pattern of powdered, crystalline DL-DOPA.½HCl and its infrared spectrum are characteristic of a mechanical mixture of the two enantiomorphs, whereas the corresponding data for the monohydrochloride indicate that DL-DOPA.HCl is a racemic compound. It is possible, therefore, to resolve DL-DOPA in an aqueous solution of hydrochloric acid having a concentration between the limits represented by points A and B in the drawing by seeding the supersaturated solution of the racemate with crystals of the desired isomorph of the hemihydrochloride.

The necessary supersaturated solution may be prepared in any conventional manner as by cooling a saturated or unsaturated solution, by adding a water-miscible non-solvent for DOPA.½HCl, such as a lower alkanol, to a relatively dilute soltuion, by evaporation of portions of the water present, and by methods specific to the properties of DOPA.½HCl such as adding a suitable amount of HCl to a suspensiori of DOPA, partial neutralization of a solution of DOPA.HCl with alkali metal hydroxide or another suitable base, suspending solid DOPA in a solution of DOPA.1HCl, dispersing solid DOPA, DOPA.½HCl, or DOPA.HCl in a solution of DOPA.½HCl, or by enriching a solution of DOPA.½HCl with chlorine ions, as by addition of NaCl or $CaCl_2$, these salts being the cheapest and most readily available sources of chlorine ions and being free of toxic cations so as to make complete removal of minor amounts of coprecipitated cation unnecessary. Those methods enumerated above which neither require the recovery of a relatively costly reagent or solvent nor heating and/or cooling are preferred for industrial application.

As is inherent in the afore-described properties of DOPA.½HCl, DL-DOPA may be optically resolved and purified by preparing therefrom a supersaturated solution of DL-DOPA.½HCl, seeding the solution with crystals of optically active DOPA.½HCl, harvesting the coarse, purified crystals formed, and decomposing them in any manner known or obvious from its chemical nature, L-DOPA being obtained most conveniently by contact of L-DOPA.½HCl crystals with water free from HCl or containing less HCl than is indicated by point A' in the drawing. Other methods for removal of the HCl from the crystals will readily suggest themselves to those skilled in the art. They may be limited to simple operations quickly performed so that oxidation of the L-DOPA can be avoided. Impurities which may have accompanied the DL-DOPA used as a starting material are largely or entirely left behind in the mother liquor from which the optically active hemihydrochloride was crystallized.

After crystallization of the desired enantiomorph, say L-DOPA.½HCl, the mother liquor is supersaturated with D-DOPA.½HCl. The tendency of the undesired enantiomorph to crystallize spontaneously is relatively weak, and it is easy to separate the L-isomer from the mother liquor before significant amounts of the solid D-isomer are formed. However, the D-isomer eventually crystallizes spontaneously and may be recovered in optically pure or at least purified form without any need for seeding. Purer D-isomer, of course, is obtained if the mother liquor is seeded with crystals in the manner described above.

The amount of seed crystals employed is not critical, but it is most economical to use the seed crystals in amounts between 1% and 10% of the weight of racemate in the supersaturated solution. The rate of resolution and the amount of optically active material that can be extratced from the supersaturated solution normally increase with the amount of seed crystals used, but the effect of the seed crystals in amounts of less than 1%, while measurable, is not sufficient under conditioins of industrial production on a large scale, and the improvement achieved by more than 10% seed crystals, while capable of being demonstrated, is not economically justified at this time.

The undesired enantiomorph of DOPA.½HCl, normally the D-isomer, is not racemized quickly under conditions as mild as those effective for D-DOPA, and the racemization reaction requires the use of vessels resistant to hydrochloric acid, such as relatively expensive stainless steel. It is therefore preferred to resolve DL-DOPA.½HCl under conditions which directly yield L-DOPA.½HCl and D-DOPA. It has been found that the method of simultaneously resolving glutamic acid and one of its salts with an acid or a base disclosed in the commonly owned United States application No. 69,992 of Kenkichi Ito et al., filed Sept. 4, 1970, and now Pat. No. 3,646,082 is applicable by analogy to the otpical resolution of DL-DOPA.

Some of the numerous variations and permutations of the method of producing L-DOPA.½HCl and D-DOPA from the same liquor are enumerated below and identified by bracketed numbers for the convenience of reference. The same methods, of course, may be employed for producing D-DOPA.½HCl and L-DOPA, but are not economically attractive at this time because of the lack of a market for pure D-DOPA.

(1) When a solution supersaturated with DL-DOPA.½HCl and containing DL-DOPA is seeded with L-DOPA.½HCl, a crystal crop of the latter is obtained and recovered. When the mother liquor is then made supersaturated with DL-DOPA, a second crystal crop of D-DOPA is precipitated.

(2) When a soltuion supersaturated with both DL-DOPA and DL-DOPA.½HCl is seeded with D-DOPA and/or L-DOPA.½HCl, both optically active compounds are crystallized without any tendency of the isomers remaining in the solution to crystallize. When seed crystals of one optically active compound are added, seed crystals of the other compound are formed spontaneously.

(3) When L-DOPA.½HCl is crystallized from a supersaturated solution of the corresponding racemate, and the mother liquor is brought into contact with solid DL-DOPA, L-DOPA is dissolved from the solid, and ultimately, there may be reached a state of equilibrium in which the solids present consist of D-DOPA partly originating from the mother liquor and partly from the solid DL-DOPA, and of L-DOPA.½HCl newly precipitated from the liquor while the latter contains equivalent amounts of L-DOPA and D-DOPA.½HCl which do not show any tendency to crystallize.

The mixtures of optically active DOPA and optically active DOPA.½HCl formed in methods (2) and (3) are readily separated on the basis of the different solubilities in water and other solvents of the two chemically different compounds.

The interaction of the optically active forms of DOPA and DOPA.½HCl will further be illustrated by the following facts:

(4) When a solution supersaturated with DL-DOPA.½HCl and saturated with DL-DOPA is seeded with crystals of L-DOPA.½HCl, the crystals grow in the expected manner. If the grown crystals are removed or not, and the mother liquor is seeded with crystals of D-DOPA, the latter will grow. If the mother liquor is seeded with L-DOPA, the seed crystals dissolve.

(5) If the first crystal crop of L-DOPA.½HCl is removed from the mother liquor in (4) above, and the latter is brought into contact with solid DL-DOPA, the L-form is preferentially dissolved from the latter, and D-DOPA is preicpitated. When the process is permitted to go to its completion, the mother liquor does not show significant optical rotation. An analogous result is achieved when the roles of DOPA and DOPA.½HCl are interchanged in the above procedure.

In its broader aspects, the relationship of DOPA and DOPA.½HCl permits both compounds in the racemic form to be resolved optically in a single procedure more advantageous than the resolution of only one compound.

Initially, an aqueous solution of both optically inactive compounds is prepared. The solution is made supersaturated with a first one of the compounds and seeded with one enantiomorph of the first compound which is then permitted to crystallize on the seed crystals until the solubility of the corresponding enantiomorph of the second compound in the residual solution is increased and the solubility of the opposite enantiomorph of the second compound is decreased. Thereafter, one may proceed without removing the first crystal crop or separate the first crystal crop from the residual solution.

When the residual solution is made supersaturated with the second compound, a second crystal crop of the opposite enantiomorph of the second compound is formed from spontaneously generated seeds. The two crystal crops are separated from the residual solution jointly or sequentially, and the jointly recovered crops are separated from each other as described above.

When the residual solution is brought into contact with an amount of the second compound in the solid state until the enantiomorph of the second compound corresponding to the previously seeded and crystallized enantiomorph of the first compound is dissolved from the solid material, a second crystal crop enriched with the opposite enantiomorph of the second compound is obtained by dissolution and/or precipitation.

A solution saturated with both optically inactive compounds may be seeded simultaneously or sequentially with seed crystals of the respective opposite enantiomorphs.

The following examples are further illustrative of this invention, but do not exhaust the modifications and permutations of which the method of this invention is obviously capable.

EXAMPLE 1

350 g. DL-DOPA were suspended in a mixture of 300 g. water and 95 ml. 35% hydrochloric acid at 50° C. The undissolved crystals of DL-DOPA were small platelets.

The mixture was stirred with 25 ml. additional 35% hydrochloric acid. The residual platelets dissolved while new prismatic crystals precipitated. When filtered out and dried, they weighed 92 g., melted at 210° C., and were identified as DL-DOPA.½HCl by elemental analysis.

|  | C | H | N | O | $C_1$ |
|---|---|---|---|---|---|
| Found | 50.21 | 5.28 | 6.56 | 29.75 | 8.20 |
| Calc'd for: $C_9H_{11}NO_4$·½HCl | 50.17 | 5.39 | 6.50 | 29.71 | 8.23 |

EXAMPLE 2

64 g. dark gray, crude L-DOPA were dissolved in 100 g. 13% hydrochloric acid with heating. When the solution was cooled to 30° C. with stirring, prismatic crystals were precipitated. When filtered out and dried, they were almost colorless and weighed 14.4 g. They melted at 223.9–224.3° C. and were identified as L-DOPA.½HCl by elemental analysis.

10 g. L-DOPA.½HCl were dispersed in 50 ml. water, and the mixture was stirred at 32° C. The platelet-shaped crystals formed were filtered off and dried. They weighed 4.2 g., were colorless, and consisted of pure L-DOPA.

EXAMPLE 3

116 g. DL-DOPA, 34 g. DL-DOPA.½HCl and 17 g. L-DOPA.½HCl were dissolved in a mixture of 448 g. water and 68 ml. 35% hydrochloric acid at 80° C. When cooled to 50° C., the solution was seeded with 3 g. L-DOPA.½HCl crystals and then further cooled to 30° C. and stirred at 30° C. for 1 hour. The prismatic crystals of the hemihydrochloride which precipitated were filtered off and dried. They weighed 38.5 g. and had an optical purity of 91.3% ($[\alpha]_D^{20} = -11.8°$, c.=2, in 1 N-HCl, as L-DOPA).

EXAMPLE 4

250 g. dark gray, crude DL-DOPA and 16 g. colorless DL-DOPA.½HCl were dissolved in 300 ml. water and 110 ml. 35% hydrochloric acid at 70° C. When cooled to 55° C., the solution was seeded with 3 g.

L-DOPA.½HCl crystals, and it was then cooled to 49° C. and stirred at same temperature for 1 hour. The prismatic, colorless crystals precipitated were filtered off and dried. They weighed 14 g. and had an optical purity of 100%.

12 g. DL-DOPA.½HCl were dissolved in the filtrate with heating. When cooled to 55° C., the solution was seeded with 3 g. D-DOPA.½HCl crystals, cooled further to 49° C., and stirred at the same temperature for 30 minutes. The prismatic and colorless crystals of D-DOPA.½HCl were filtered off and dried. They weighed 15.5 g. and had an optical purity of 100%.

EXAMPLE 5

140 g. DL-DOPA.½HCl and 750 g. DL-DOPA were dissolved in 900 g. water and 330 g. 35% hydrochloric acid at 90° C. When cooled to 70° C., the solution was seeded with 20 g. D-DOPA.½HCl crystals of a size retained on a 32 mesh screen and 5 g. L-DOPA.½HCl crystals passing through a 150 mesh screen, and the seeded solution was cooled to 50° C. over a period of 1 hour.

The solid precipitate was filtered off, washed with acetone, and dried. It was separated by means of a 32-mesh sieve into an 85 g. fraction of D-DOPA.½HCl crystals (optical purity 98%) and 78 g. of L-DOPA.½HCl crystals (optical purity 90%).

EXAMPLE 6

750 g. DL-DOPA were dissolved in 900 g. water and 330 g. 35% hydrochloric acid at 70° C. When cooled to 48° C., the solution was seeded with 3 g. L-DOPA.½HCl crystals. 23.2 g. DL-DOPA.HCl and 19.1 g. DL-DOPA were gradually dissolved in the solution to make it supersaturated with respect to DL-DOPA.½HCl.

After the mixture was stirred for 1½ hours, the crop of crystals obtained was filtered out and dried. It consisted of L-DOPA.½HCl, weighed 22.4 g., and had an optical purity of 95.2%.

EXAMPLE 7

700 g. DL-DOPA were added to 1305 g. water and 270 ml. 35% hydrochloric acid, and the mixture was stirred at 30° C. for a day. The undissolved crystals were removed by filtering. 50 g. L-DOPA.½HCl and 102 g.

DL-DOPA.½HCl were dissolved in the filtrate at 90° C. When cooled to 60° C., the solution was seeded with 10 g. L-DOPA.½HCl crystals, and further cooled to 30° C. After stirring for 1 hour, the precipitated, prismatic crystals of L-DOPA.½HCl were filtered off and dried. They weighed 109 g. and had an optical purity of 95%.

50 g. DL-DOPA were dissolved in the filtrate with heating. When cooled to 45° C., the solution was seeded with 5 g. D-DOPA crystals and further cooled to 30° C. After stirring for 30 minutes, the precipitated crystals of D-DOPA were filtered off and dried. They weighed 54 g. and had an optical purity of 98% ($[\alpha]_D^{20} = -11.8°$, c.=2, in 1 N-HCl).

EXAMPLE 8

700 g. DL-DOPA were added to 1305 g. water and 270 ml. 35% hydrochloric acid. The mixture was stirred at 30° C. for a day, and the undissolved crystals were removed by filtering. 45 g. L-DOPA.½HCl, 6 g. L-DOPA and 102 g. DL-DOPA.½HCl were dissolved in the filtrate at 80–90° C. When cooled to 55° C., the solution was seeded with 10 g. L-DOPA.½HCl crystals and further cooled to 30° C. After stirring for 1 hour, the precipitated crystals of L-DOPA.½HCl were filtered off and dried. They weighed 111 g. and had an optical purity of 97%.

95 g. DL-DOPA were dissolved in the filtrate with heating. When cooled to 70° C., the solution was seeded with 10 g. D-DOPA crystals, and further cooled to 30° C. After stirring for 30 minutes, the precipitated crystals of D-DOPA were filtered out and dried. They weighed 102 g. and had an optical purity of 97%.

EXAMPLE 9

604 g. DL-DOPA and 77 g. DL-DOPA.½HCl were added to 1595 g. 1.63N hydrochloric acid with heating. When cooled to 55° C., the solution was seeded with 15 g. L-DOPA.½HCl crystals having a grain size of 20–32 mesh and 10 g. D-DOPA crystals passing through a 150-mesh screen, and cooled further to 30° C. After stirring at the same temperature for 30 minutes, the solid material precipitated was filtered out, washed with acetone, and dried. The dry solids were fractionated by means of a 32 mesh sieve, giving 80 g. D-DOPA platelets (optical purity 85%) and 75 g. columnar L-DOPA.½HCl crystals (optical purity 100%).

EXAMPLE 10

604 g. DL-DOPA and 77 g. DL-DOPA.½HCl were suspended in 1595 g. 1.63N hydrochloric acid. The resulting slurry was heated to dissolve the DL-DOPA.½HCl crystals, leaving the DL-DOPA crystals undissolved. The slurry was further processed as in Example 9, but not being seeded with smaller crystals of D-DOPA (the slurry was contacted with the undissolved DL-DOPA), yielding 78 g. D-DOPA crystals (optical purity 85%) and 76 g. of L-DOPA.½HCl crystals (optical purity 99%).

EXAMPLE 11

534 g. DL-DOPA and 4 g. DL-DOPA.½HCl were dissolved in 272 g. 35% hydrochloric acid with heating. When cooled to 30° C., the solution was mixed with 211 g. DL-DOPA and 30 g. L-DOPA.½HCl crystals having a grain size smaller than 32 mesh. The slurry was kept at 30° C. while 25.6 ml. 35% HCl were added drop wise over a period of 5 hours with stirring. The solid material precipitated was fractionated by means of a 32-mesh screen, yielding 110 g. smaller D-DOPA crystals (optical purity 94%) and 130 g. larger L-DOPA.½HCl crystals (optical purity 95%).

EXAMPLE 12

534 g. DL-DOPA and 5 g. DL-DOPA.½HCl were dissolved in 272 g. 35% hydrochloric acid and 1323 g. water with heating. When cooled to 30° C., the solution was mixed with 303 g. DL-DOPA and 50 g. D-DOPA.½HCl having a grain size smaller than 32 mesh. The slurry was kept at 30° C. while 120 g. DL-DOPA.HCl were gradually added over a period of 7 hours with stirring. After the mixture was stirred for another hour, the crystals formed were filtered off and dried. They were fractionated by means of a 32-mesh screen into 250 g. larger D-DOPA.½HCl crystals (optical purity 97%) and 208 g. smaller L-DOPA crystals (optical purity 93%).

EXAMPLE 13

534 g. DL-DOPA were dissolved in 1595 g. 1.63N hydrochloric acid with heating. When cooled to 30° C., the solution was mixed with 200 g. DL-DOPA.½HCl and 20 g. L-DOPA. The slurry was kept at 32° C. while 190 g. needle-shaped crystals of DL-DOPA were added over a period of 1 hour with stirring. After being stirred another hour, the slurry containing L-DOPA and D-DOPA.½HCl in the crystalline form was mixed with 1 liter 0.5N hydrochloric acid and then promptly filtered, giving 195 g. L-DOPA (optical purity 92%). The filtrate was mixed with 250 g. DL-DOPA.½HCl at 30° C., the resulting slurry was stirred for 3 hours, and the D-DOPA.½HCl crystals formed were filtered out. They weighed 180 g. and had an optical purity of 98%.

What is claimed is:
1. The compound, 3,4-dihydroxyphenylalanine.

References Cited

UNITED STATES PATENTS

| | | | |
|---|---|---|---|
| 3,158,648 | 11/1964 | Jones et al. | 260—519 |
| 3,405,159 | 10/1968 | Krieger et al. | 260—519 |
| 3,646,082 | 2/1972 | Ito et al. | 260—534 G |

FOREIGN PATENTS

| | | |
|---|---|---|
| 1,241,405 | 8/1971 | Great Britain. |

OTHER REFERENCES

Yamada et al., Chemical & Pharmaceutical Bulletin (Japan), vol. 10 (1962), pp. 680 and 685.

LORRAINE H. WEINBERGER, Primary Examiner

P. J. HAGAN, Assistant Examiner

UNITED STATES PATENT OFFICE
CERTIFICATE OF CORRECTION

Patent No. 3,830,836     Dated August 20, 1974

Inventor(s) SOICHIRO ASAI ET AL

It is certified that error appears in the above-identified patent and that said Letters Patent are hereby corrected as shown below:

In the heading, 7th line after the title, change "46/128,861" to -- 45/128,861 --; change "46/128,715" to -- 45/128,715 --.

In claim 1, after "3,4-dihydroxyphenylalanine" insert -- hemihydrochloride --.

Signed and sealed this 19th day of November 1974.

(SEAL)
Attest:

McCOY M. GIBSON JR.
Attesting Officer

C. MARSHALL DANN
Commissioner of Patents